United States Patent
Neem et al.

(10) Patent No.: US 6,321,783 B1
(45) Date of Patent: Nov. 27, 2001

(54) CLOSED SYSTEM MOTOR

(76) Inventors: Hillar Neem, Törnrosvägen 16C, S-435 21; Vladimir Kangas, Rönngården 51, S-435 31, both of Mölnlycke (SE)

(*) Notice: Subject to any disclaimer, the term of this patent is extended or adjusted under 35 U.S.C. 154(b) by 0 days.

(21) Appl. No.: 09/509,149
(22) PCT Filed: Sep. 30, 1998
(86) PCT No.: PCT/SE98/01767
§ 371 Date: Mar. 17, 2000
§ 102(e) Date: Mar. 17, 2000
(87) PCT Pub. No.: WO99/17018
PCT Pub. Date: Apr. 8, 1999

(30) Foreign Application Priority Data

Sep. 3, 1997 (SE) .................................................. 9703524

(51) Int. Cl.$^7$ ....................................................... F03G 3/00
(52) U.S. Cl. ................................ 137/565.34; 137/565.01; 73/861.356
(58) Field of Search ........................ 137/565.01, 565.34; 73/861.356

(56) References Cited

U.S. PATENT DOCUMENTS

| 4,660,421 | 4/1987 | Dahlin et al. . |
| 4,711,132 | 12/1987 | Dahlin . |
| 4,733,569 | 3/1988 | Kelsey et al. . |
| 4,984,472 | 1/1991 | Dahlin . |
| 5,357,811 | 10/1994 | Hoang . |

FOREIGN PATENT DOCUMENTS

| 19530907 | 2/1997 | (DE) . |
| 0271605 | 6/1988 | (EP) . |
| 0421812 | 4/1991 | (EP) . |
| 0763720 | 3/1997 | (EP) . |

Primary Examiner—Kevin Lee
(74) Attorney, Agent, or Firm—Orum & Roth

(57) ABSTRACT

The invention relates to a closed system. It consists of a spirally-wound elastic pipe (1), inside which a fluid flows, and a straight rubber pipe (2) extending in the center of the spiral, inside which pipe the fluid is so arranged as to flow in the opposite direction, i.e. the fluid circulates inside a closed circuit formed in this way. The system is so arranged as to be extended and compressed so that the internal forces therein enter into a state of imbalance during the actual extension and compression process, and so that the system is thereby so arranged as to begin to move because of the internal forces, which can be utilized as an energy source.

11 Claims, 2 Drawing Sheets

CLOSED SYSTEM MOTOR

BACKGROUND OF THE INVENTION

The present invention relates to a closed system.

Drive systems are previously disclosed through each of DE 19517181 A1 and DE 19530907 A1. These are not closed systems, however, and their function is not as effective as one might wish.

The principal object of the present invention is thus, in the first instance, to make available a closed system enabling the internal forces of the system to be used as an energy source with the help of a circulating fluid.

SUMMARY OF THE INVENTION

The said object is achieved by means of a closed system in accordance with the present invention, which is characterized essentially in that it consists of a spirally-wound elastic pipe, inside which a fluid flows, and a straight rubber pipe extending in the centre of the spiral, inside which the fluid is so arranged as to flow in the opposite direction, i.e. the fluid circulates inside a closed circuit formed in this way, in that the system is so arranged as to be extended and compressed so that the internal forces therein enter into a state of imbalance during the actual extension and compression process, and in that the system is thereby so arranged as to begin to move because of the internal forces, which can be utilized as an energy source.

DESCRIPTION OF THE DRAWINGS

The invention is described below as a preferred illustrative embodiment, in conjunction with which reference is made to the accompanying drawings, in which.

DETAILED DESCRIPTION

Figure 1:
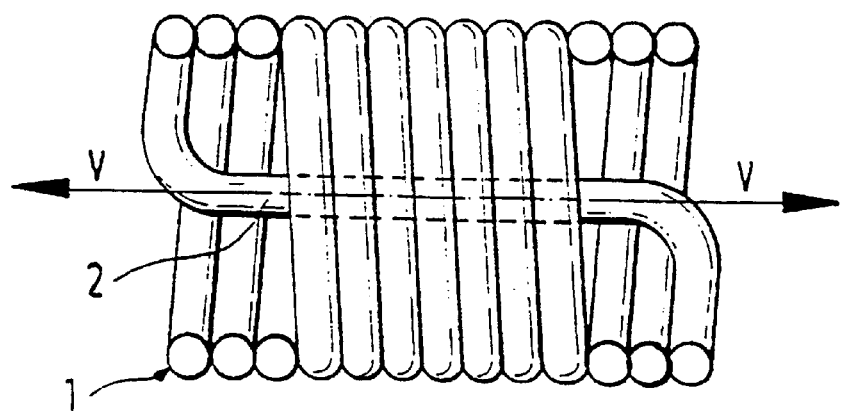
FIG. 1 shows the system viewed from the side and with a spirally-wound elastic pipe in a compressed position.

A closed system in accordance with the invention, which is in a state of imbalance, is shown in FIG. 1. It consists of a spirally-wound elastic pipe 1, inside which fluid flows, and a rubber pipe 2, in which the fluid 3 flows in the opposite direction, i.e. the fluid circulates inside a closed circuit 4. A pump 5 can also be connected in the circuit 4.

If this system is extended or compressed, the internal forces will enter into a state of imbalance during the actual extension and compression process, and the system will begin to move because of the internal forces.

We will now make a calculation of the system:

a) Spiral

Figure 2:
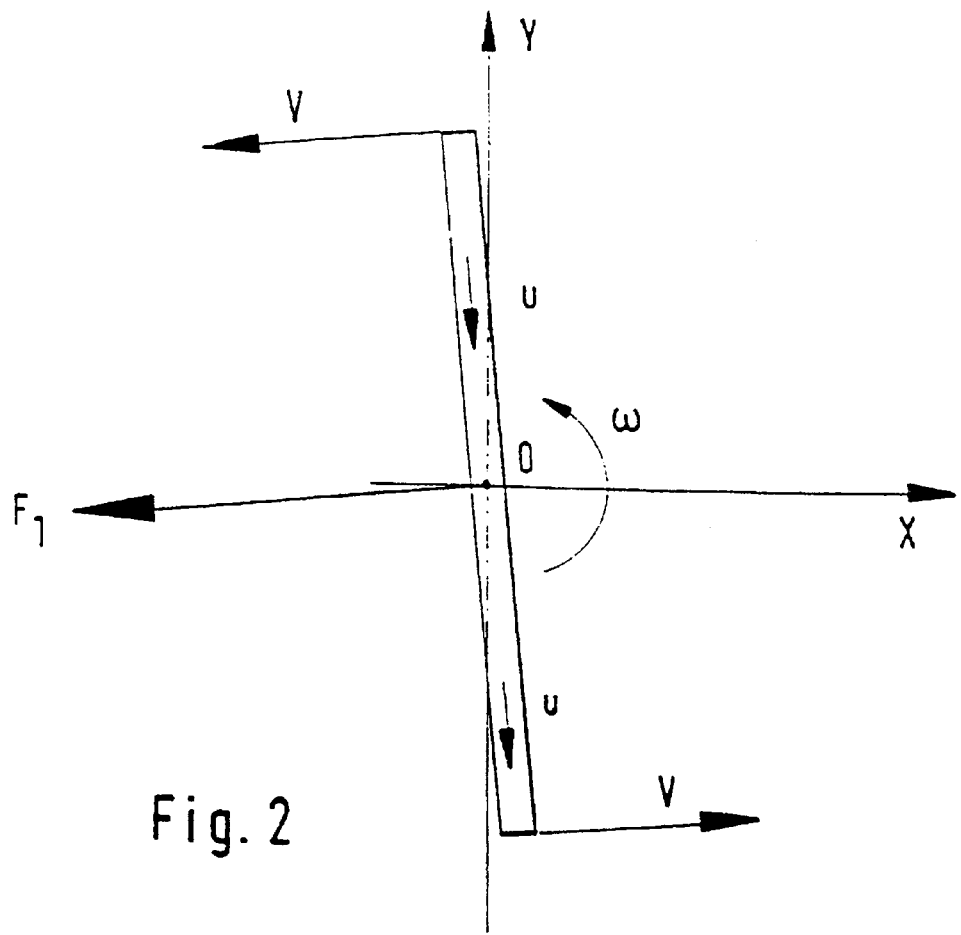
FIG. 2 shows an involute of the spiral.

To facilitate the calculation, we will regard the spiral as a straight pipe, see FIG. 2, which rotates about the centre of rotation $0$ at an angular velocity $\omega$. The fluid will then influence the internal walls of the pipe with the Coriolis force $$F_1 = 2m\omega u$$

where
  m—mass of fluid inside the pipe=$\rho s 2R$
  $\rho$—density of the fluid
  s—internal cross-sectional area of the pipe
  u—relative velocity of the fluid inside the pipe.

We will now perform a substitution $$F_1 = 2\rho s 2R\omega u$$

but $R\omega = v$, the linear rotational velocity of the end of the pipe (the end of the spiral), then becomes $$F_1 = 4\rho s u v \quad (I)$$

It is this force that acts on the spiral.

b) Force Acting on the Rubber Pipe During Extension

Necessary Assumptions

1. The volume of the fluid inside the pipe remains unchanged.
2. The condition in respect of uninterrupted flow must be met $$su = s_1 u_1 = \text{constant}$$

where
  $S_1$—internal cross-sectional area of the pipe at a given moment;
  $u_1$—relative velocity of the fluid at a given moment.

We calculate the length of the pipe as:

$$L = 2vt$$

where: t—time taken to extend the pipe.

We calculate the impulse of the fluid (momentum) inside the pipe as $$P = m u_1 = \rho s_1 2 v t u_1$$

We calculate the force acting on the fluid during its acceleration $$F_2 = P/t = 2\rho s_1 u_1 v = 2\rho s u v \quad (II)$$

The Coriolis force is thus $F_k = 4\rho s u v$;

the force of the rubber pipe is $F_g = 2\rho s u v$;

and the reaction force is $F_r = F_k - F_g = 2\rho s u v$

It is possible to draw the following conclusion from equations I and II in respect of the system considered above:

When this system is extended or compressed, a state of imbalance occurs in the internal forces, which can be utilized as a source of energy or for powering space vehicles.

The technical effect of the invention is explained in more detail below:

The characteristics of the present closed system of a spiral and a rubber pipe can be summarized as follows:

If the liquid is stationary inside the pipe, the force required to extend the spiral need only overcome any elastic resistance in the pipe, and the extension forces at both ends must be opposite and equally large forces in order for the centre of gravity not to move.

A greater extension force will be required if the liquid is pumped around, on the other hand. This is explained by the fact that an acceleration (=Coriolis acceleration) is required in order to maintain a constant relative velocity for the liquid when the spiral is extended at a constant rate. The corresponding force, the Coriolis force, is twice that required to impart the change in momentum to the liquid to which the rate of extension corresponds. The return flow of the liquid through the rubber pipe causes the momentum to revert to its initial value, for which half the Coriolis force is accordingly required.

Because the liquid is pumped round in a particular direction, what we have here is an asymmetrical system, and for this reason the Coriolis force exhibits a particular direction. The Coriolis force originates from the extension force for the spiral, however, which also becomes asymmetrical as a result.

If we apply such an asymmetrical force from outside, we will obtain an asymmetrical motion, namely a motion of the centre of gravity, for the entire system.

If the entire arrangement stands on a trolley, on which the extension arrangement for the spiral also stands, the asymmetrical force from the extension arrangement will be offset by an equally large, opposite reaction force imposed on the trolley via the base of the extension arrangement.

The other half of the Coriolis force is thus offset by a reaction force from the extension arrangement.

Figure 3:
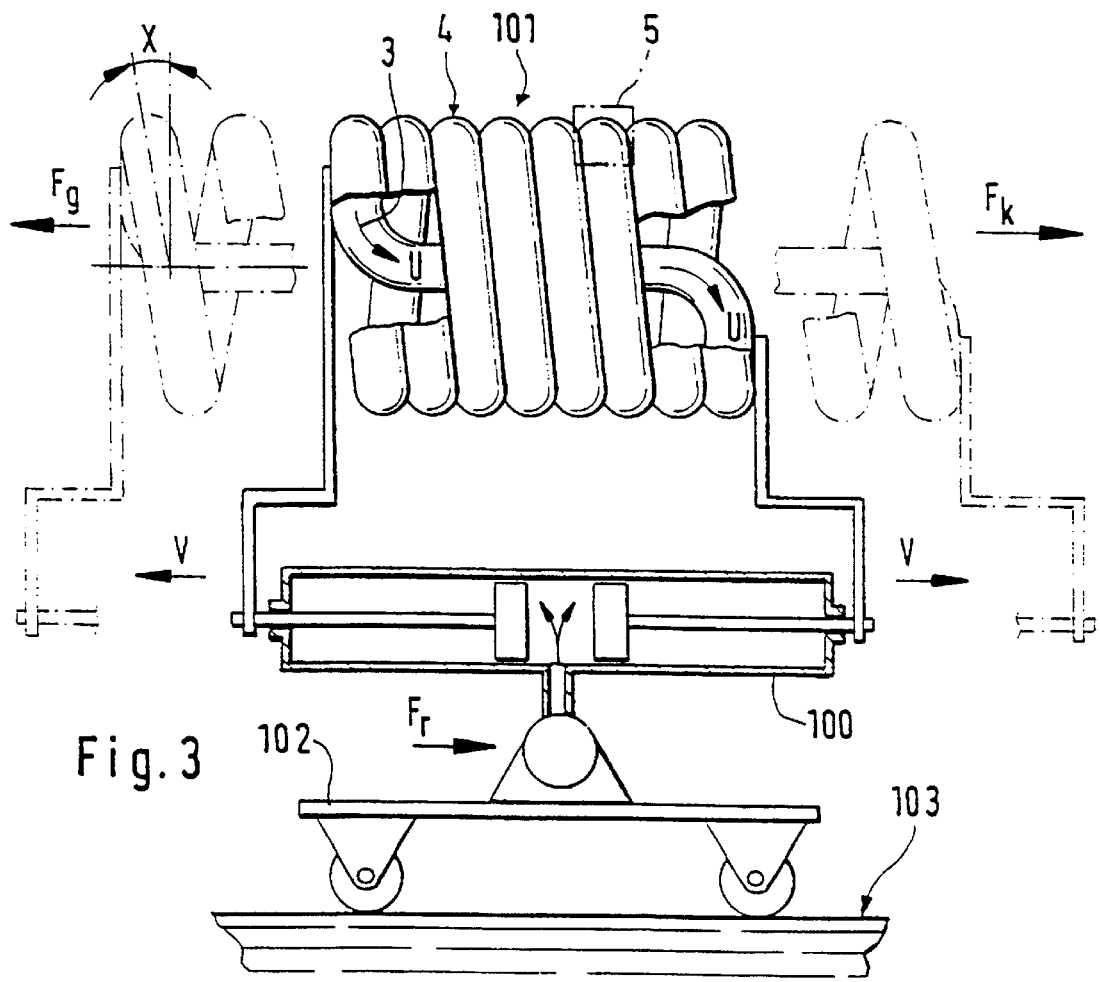
FIG. 3 shows a trolley driven by means of a closed system in accordance with the invention.

The invention is exemplified as a functional example in the form of a trolley illustrated in FIG. 3.

Since the spiral 1, which may be inclined at an angle X of ca. 5°, and the rubber pipe 2 are securely mounted on a extension arrangement 100, and the arrangement itself 101 is placed on a trolley 102 which runs on a base 103, the trolley 102 is acted upon by a reaction force from the extension arrangement 100 and begins to move. We regard the trolley 102 itself, however, with all its equipment as a closed system, and we define all the forces that act in the system as internal forces. We can establish, therefore, that the trolley 102 acquires its motion from the impulse that is achieved by the unbalanced internal forces. This is why we refer to the system as an "unbalanced closed system".

Fundamental Concept for Achieving an Unbalanced Closed System

Figure 4:
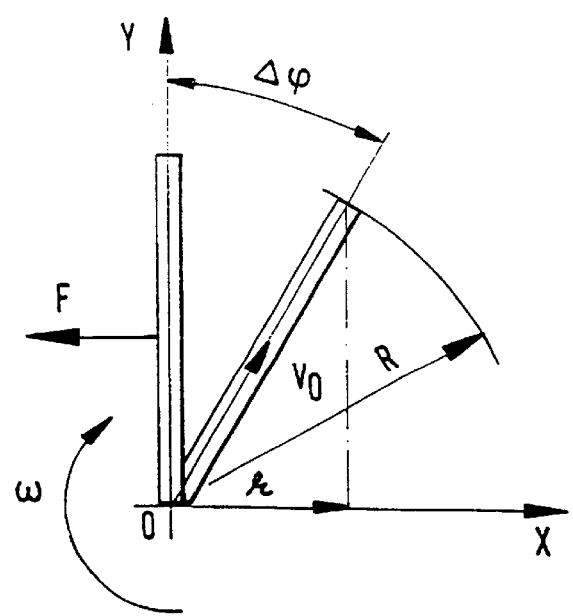
FIG. 4 shows a pipe which rotates about its centre of rotation.

FIG. 4 shows a pipe which rotates about a centre of rotation $0$, with an angular velocity $\omega \cdot V_0$—the relative velocity of the fluid inside the pipe. The fluid will then influence the internal wall of the pipe with the Coriolis force:

$$F = 2 \cdot m \cdot \omega V_0$$

where
- m—mass of fluid inside the pipe $m = \rho \cdot s \cdot R$
- $\rho$—density of the fluid
- s—internal cross-sectional area of the pipe.

We calculate that the impulse from the Coriolis force over time=$\Delta t$.

Force: $F = 2\rho s R \, \Delta\psi/\Delta t \, V_0 \quad \Delta\psi = \omega \cdot \Delta t \quad \nu = R \cdot \Delta\psi$ Impulse: $P_{1x} = F \cdot \Delta t = 2\rho S \nu V_0$ The impulse of the fluid (momentum) inside the pipe $P_2 = m \cdot V_0$ Projected on the axis x $P_{2x} = \rho s \nu V_0$ Consequently, $P_{1x} > P_{2x}$ The closed system in accordance with the present invention consists of two main parts:

SPIRAL 1 AND RUBBER PIPE 2.

The extension arrangement, mounting and trolley are only an illustration of the closed system. The spiral and the rubber pipe have been calculated separately with the help of different calculation methods. All the calculations pointed to the same result as that achieved in accordance with the present invention. Two of the calculation methods are presented below.

Calculation Method No. 1

Coriolis Force

When a particle or a mass element moves within a system that is rotating, it is subjected to forces of inertia, i.e. forces which, in the rotating system, appear to endeavour to displace the particle from its path. Centrifugal force and the Coriolis force are such forces of inertia.

Centrifugal force is actually the "experience" by the particle of a centripetal acceleration, i.e. a force imposed on the particle causing it to move in a curved path rather than in a rectilinear motion. In the same way, the Coriolis force is the "experience" by the particle of a Coriolis acceleration, which causes the particle to deviate from its rectilinear relative motion.

An example of the effect of the Coriolis force is the movement of winds around low-pressure centres, where the rotation of the earth causes the direction of the wind towards the centre to appear to deviate to the right (in the Northern Hemisphere).

The size and direction of the Coriolis force is determined by the vector equation $F_c = -2m\omega V_1$ where m is the mass, $\omega$ is the rotational angular velocity, and v is the relative velocity.

Fundamental Motion Equations in a Two-dimensional Rotating Co-ordinate System

In a polar rotating co-ordinate system, the acceleration is $$a_r: \ddot{r} - r\dot\omega^2 = \ddot{r} - r\omega^2$$

$$a_\theta: r/[\$]\$\ddot{g}\ddot{q} + 2\dot{r}\theta = r\dot\omega + 2\dot{r}\omega$$

Force in the radial sense: $F_r = m\ddot{r} - mr\omega^2$

Force in the transverse sense: $F_\theta = mr\dot\omega + 2m\dot{r}\omega$

The Coriolis force $2m\dot{r}\omega$ or $2mv\omega$ is a force of inertia which the particle (the fluid package) m senses in the rotating system.

Let us assume that $F_r = 0$ (i.e. the particle moves only due to centrifugal force and $\omega$ constant).

$$\ddot{r}\,d\dot{r} = a^2\, r\,dr$$
$$\frac{d\dot{r}}{dt} = \frac{d\dot{r}}{dr}\dot{r} \quad \dot{r}^2 = \omega^2\, r^2$$
$$\dot{r} = \omega\, r$$

i.e. the Coriolis force $F_\theta = 2m\omega^2 r$ is equal to twice the centrifugal force.

The kinetic energy in the system can be described as $$T = \frac{1}{2}I\omega^2 + \frac{1}{2}m(\dot{r}^2 + (r\omega)^2)$$

where I is the mass-moment of inertia with regard to the axis of rotation. On the above assumption, $\dot{r} = r\omega$ and $$T = \frac{1}{2}(I + 2\,mr^2)\omega^2$$

Fluid flow in a spiral-shaped pipe

Both the Coriolis force and other forces of inertia occur in the proposed spiral flow, due to the fact that a fluid flows inside a spiral-shaped pipe that is expanded/contracted at the same time. If v denotes the velocity vector of the fluid at each point, and if $\omega$ denotes the rotational angular velocity vector of the pipe at the same point in conjunction with the expansion, then the Coriolis force on the fluid is $-2\rho s\omega \times v$ with a resultant facing towards the right. Here the mass m=the density $\rho$ times the volume s, assuming an ideal flow.

With the linear elongation rate u, the number of revolutions n, the radius r of the spiral and the cross-sectional area a of the pipe, it is possible to write $\omega$ as $\omega = u/2\pi rn$ and $s = 2\pi ran$, of which the Coriolis force is:

$$F_c = 2\rho a u v$$

Calculation Method No. 2

1 Introduction

Consider a spiral-shaped pipe with a constant cross-section A through which an incompressible liquid with a mass density $\rho$ flows at a constant velocity $\upsilon_0$. The spiral is assumed to have the radius R, the length L and N revolutions. The spiral can be described with the parameter representation $$r = \left(R\cos\alpha, R\sin\alpha, \frac{L}{2\pi N}\alpha\right), 0 \le \alpha \le 2\pi N, \quad (1)$$

where $\alpha$ is an angle of rotation about the z-axis, which for the sake of simplicity has been positioned along the axis of the spiral.

2 Motion Equations of the Liquid

Let us assume that the liquid is pumped in at $\alpha=0$, i.e. at the point $r=(R,0,0)$, and is led out at $\alpha=2\pi N$, i.e. at the point $r=(R,0,L)$. We will ignore supply lines and return lines here. We can take these into account at a later stage, if necessary.

Let us now imagine that the spiral is extended or compressed, so that its length is time-dependent:

$$L = L(t) \Rightarrow b(t) = \frac{L(t)}{2\pi N} = b_0 + b_1 t \quad (2)$$

We will assume here that the time-dependence is linear, so that the velocity $\upsilon_1$ of the end of the spiral remains constant:

$$\upsilon_1 = L'(t) = 2\pi N b_1 \quad (3)$$

The constant $b_0$ is given by the initial length of the spiral:

$$L(0) = 2\pi N b_0 \quad (4)$$

The tangential direction of the pipe is obtained from the parameter representation through derivation $$\frac{dr}{d\alpha} = (-R\sin\alpha, R\cos\alpha, b(t)) = R\hat{\alpha} + b(t)\hat{z}, \quad (5)$$

where we have used two of the base vectors in cylinder co-ordinates:

$$\begin{cases} \hat{r} = (\cos\alpha, \sin\alpha, 0) \\ \hat{\alpha} = (-\sin\alpha, \cos\alpha, 0) \\ \hat{z} = (0, 0, 1) \end{cases} \quad (6)$$

2 Motion Equations of the Liquid

Let us now consider a small volume element dV of the liquid and follow its motion. We will assume that its position is described by the angle $\alpha=\alpha(t)$ on the spiral:

$$r(t) = (R\cos\alpha(t), R\sin\alpha(t), b(t)\alpha(t)) \quad (7)$$

In such a case, its velocity is $$u(t) = r'(t) = (-\alpha'(t)R\sin\alpha(t), \alpha'(t)R\cos\alpha(t), b'(t)\alpha(t) + b(t)\alpha'(t)) \quad (8)$$

and its acceleration is $$a(t) = u'(t) = (-[\alpha'(t)]^2 R\cos\alpha(t) - \alpha''(t)R\sin\alpha(t), -[\alpha'(t)]^2 R\sin\alpha(t) + \alpha''(t)R\cos\alpha(t), b''(t)\alpha(t) + 2b'(t)\alpha'(t) + b(t)\alpha''(t)). \quad (9)$$

The velocity can be written as $$u(t) = \alpha'(t)R\hat{\alpha} + [b'(t)\alpha(t) + b(t)\alpha'(t)]\hat{z} \quad (10)$$

and the acceleration as $$a(t) = -[\alpha'(t)]^2 R\hat{r} + \alpha''(t)R\hat{\alpha} + [b''(t)\alpha(t) + 2b'(t)\alpha'(t) + b(t)\alpha''(t)]\hat{z}. \quad (11)$$

Here we can interpret the first expression as the centripetal acceleration that is required in order to maintain the liquid at a constant distance R from the axis, the second expression as a possible angular acceleration for the liquid, and the final expression as an acceleration in the z-direction that we will examine more closely.

Newton's motion equation for our small volume of liquid dV can now be written as $$\rho dV a(t) = dF. \quad (12)$$

The force dF consists partly of normal forces from the pipe wall, and partly of compressive forces along the pipe, which arise because the pressure in the pipe does not need to be constant. We will assume that other conceivable forces, gravity and the internal friction in the liquid are small. If necessary, we can compensate for them later.

Let $p(\alpha)$ be the pressure in the liquid. The force resultant on dV from the pressure is then $$dF_p = -A[p(\alpha+d\alpha) - p(\alpha)]\hat{\tau}, \quad (13)$$

where $\hat{\tau}$ is the unit tangent to the pipe, $$\hat{\tau} = \frac{\frac{dr}{d\alpha}}{\left|\frac{dr}{d\alpha}\right|} = \frac{R\hat{\alpha} + b(t)\hat{z}}{\sqrt{R^2 + [b(t)]^2}}. \quad (14)$$

We have assumed that dV is the volume between $\alpha$ and a $\alpha+d\alpha$, i.e. $dV = AR d\alpha$.

We can now eliminate the unknown normal forces by projecting Newton's equation on the direction $\hat{\tau}$. This gives $$\rho A R d\alpha \hat{\tau} \cdot a(t) = -A[\tau(\alpha+d\alpha) - \rho(\alpha)] = -A\rho'(\alpha)d\alpha, \quad (15)$$

where $d\alpha$ is infinitesimal. By inserting the acceleration (11) and the expression (14) for the tangent, this gives the dependence of the pressure on other quantities:

$$p'(\alpha) = -\rho R \alpha''(t) R^2 + \frac{b(t)[b''(t)\alpha(t) + 2b'(t)\alpha'(t) + b(t)\alpha''(t)]}{\sqrt{R^2 + ([b(t)])^2}} \quad (16)$$

3 Solution

Here both $\alpha(t)$ and $p(\alpha)$ are unknown quantities, which is why we need one more correlation. We can obtain this from the condition that the liquid flow $\Phi_0 = \rho A \upsilon_0$ shall be the same everywhere in the pipe, i.e.

$$\hat{\tau} \cdot u(t) = \upsilon_0. \quad (17)$$

This gives $$\alpha'(t)R^2 + b(t)[b'(t)\alpha(t) + b(t)\alpha'(t)] = \upsilon_0 \sqrt{R^2 + [b(t)]^2}. \quad (18)$$

Equation (18) is a differential equation of the first order with the solution $$\alpha(t) = \frac{v_0 t}{\sqrt{R^2 + [b(t)]^2}}, \quad (19)$$

if we insert $\alpha(0)=0$.

The denominator in equation (19) obviously derives from the fact that the extension process causes elongation of the spiral. Because we have inserted the cross-section A, the radius R and the velocity $v_0$ with constant values, this means that the angular velocity $\alpha'(t)$ must decrease as the liquid moves upwards in the spiral. A more physically reasonable assumption would perhaps be to permit the radius to reduce, so that the length of the spiral becomes constant. Instead of concerning ourselves with such details, however, let us assume that the pitch of the spiral is small in relation to the radius, $$[b(t)]^2 << R^2. \quad (20)$$

This then gives approximately $$\alpha(t) = \frac{v_0 t}{R}, \quad \alpha'(t) = \frac{v_0}{R}, \quad \alpha''(t) = 0. \quad (21)$$

By inserting this approximation, together with the expression (2) for the pitch of the spiral, into pressure equation (16), we now obtain $$p'(\alpha) = -2\rho b_1 b(t) \frac{v_0}{R}, \quad (22)$$

which can be rewritten as $$p'(\alpha) = -\frac{\rho v_0 v_1}{2\pi^2 N^2 R}\left[L + \frac{v_1 R}{v_0}\alpha\right]. \quad (23)$$

4 Dynamic Forces

Integration gives $$p(\alpha) = p_0 - \frac{\rho v_0 v_1 L}{2\pi^2 N^2 R}\alpha - \frac{\rho v_1^2}{4\pi^2 N^2}\alpha^2, \quad (24)$$

which gives the pressure at the upper end of the spiral:

$$p(2\pi N) = p_0 - \frac{\rho L}{\pi N R} v_0 v_1 - \rho v_1^2 \quad (25)$$

The expression (11) for the acceleration can be simplified with the approximation used above as $$a(t) = -\frac{v_0^2}{R}\hat{r} + 2b_1 \frac{v_0}{R}\hat{z}, \quad (26)$$

which gives the force of inertia in the z-direction for the liquid element:

$$dF_x^{inert} = \rho d\, V\hat{z}\cdot a(t) = \rho AR d\alpha 2 b_1 \frac{v_0}{R} = 2\rho A v_0 \frac{v_1}{2\pi N}d\alpha \quad (27)$$

When integrated over the whole spiral, this gives $$F_x^{inert} = 2\rho A v_0 v_1, \quad (28)$$

This is the same expression that we obtain from the Coriolis acceleration.

Our method of calculation means that we note that the extension of the spiral can be viewed as a rotation with a certain angular velocity of each revolution of the spiral plus a translation of the revolution at constant velocity. Let us now examine what normal forces can be generated by the motion.

We have already identified the centripetal acceleration and the corresponding force in the $\hat{r}$-axis.

On the other hand, we need to examine more closely the force in the direction perpendicular to $\hat{\tau}$ (see equation. (14)).

$$\hat{v} = \frac{-b(t)\hat{\alpha} + R\hat{z}}{\sqrt{R^2 + [b(t)]^2}}. \quad (29)$$

The projection of Newton's equation on this direction gives $$\hat{v}\cdot dF = [-b(t)\alpha''(t) + b''(t)\alpha(t) + 2b'(t)\alpha'(t) + b(t)\alpha''(t)] \quad (30)$$

$$\frac{\rho A R^2 d\alpha}{\sqrt{R^2 + [b(t)]^2}}.$$

Summary

In the approximation used above, this becomes $$\hat{v}\cdot dF = 2\rho A b_1 v_0 d\alpha. \quad (31)$$

In the same approximation, $\hat{v}=\hat{z}-(b(t)/R)\hat{\alpha}$, where the $\hat{z}$-component dominates. Thus, $$dF_x \approx 2\rho A b_1 v_0 d\alpha, \quad (32)$$

which, when integrated, gives $$F_x \approx 2\rho A v_0 v_1, \quad (33)$$

i.e. the normal force component that gives the Coriolis acceleration.

The $\hat{\alpha}$-component of the normal force is a factor $b(t)/R$ times smaller than the $\hat{z}$-component:

$$dF_\alpha \approx -\frac{2\rho A b(t)}{R} v_0 b_1 d\alpha \quad (34)$$

This force matches expression (22), $dF_\alpha \approx Ap'(\alpha)$.

We can now establish that, if gravity and the internal friction are ignored, the following forces will occur:

1. If the spiral is at rest, the liquid has a constant velocity in the z-axis, but it will have centripetal acceleration $-v_0^2/R\, \hat{r}$. This is maintained by a normal force from the pipe wall acting on the liquid, which may be written as follows for a small volume dV:

$$dF_r = -\rho dV \frac{v_0^2}{R}\hat{r}. \quad (35)$$

2. If the spiral is extended at a constant velocity $v_1$, the liquid must be accelerated in the z-direction. In a first approximation, this acceleration has the quantity $$\frac{v_o v_1}{\pi N}, \qquad (36)$$

which requires a normal force from the pipe wall to act on the liquid. For the volume dV, this must hve the z component $$dF_z = \rho dV \frac{v_o v_1}{\pi N} \qquad (37)$$

This force must be supplied in conjunction with the extension. An additional extension force is thus required due to the motion of the liquid $v_0$, $$F_z = 2\rho A v_0 v_1 \qquad (38)$$

This is the Coriolis force.

3. Due to the pitch of the spiral, the normal force in the previous point also has an α component $$dF\alpha = \rho dV \frac{v_o v_1}{\pi NR} \qquad (39)$$

This builds up a pressure differential between the ends of the spiral in accordance with equation (25) above.

The summary force from the pressure is normal to axis Z, which is why the spiral is not affected in direction Z.

In both of the above methods of calculation, the spiral is extended on one side, and we can describe this as asymmetrical extension.

If we were to extend the spiral on both sides, the Coriolis force would double to become $$F_c = 4\rho suv$$

We describe this extension as "symmetrical extension".

The rubber pipe is affected only by acceleration forces from the fluid inside the rubber pipe, and these are equivalent to:

1. For asymmetrical extension $F_{ac} = \rho suv$
2. For symmetrical extension $F_{ac} = 2\rho suv$ The present invention is not restricted to the illustrative examples described above and illustrated in the drawings, but may be varied within the scope of the Patent Claims without departing from the idea of invention.

What is claimed is:

1. A closed system motor comprising:
    a spirally wound about a center axis elastic pipe having first and second ends inside which a fluid flows, and
    a straight pipe which connects said first end to said second end made of rubber extending in the center of the spirally-wound about a center axis elastic pipe,
    inside the straight pipe the fluid is so arranged as to flow in the opposite direction, wherein the fluid circulates inside a closed circuit, in that the motor is so arranged as to be extended and compressed so that internal forces therein enter into a state of imbalance during an extension and compression, and in that the motor is thereby so arranged as to begin to move because of the internal forces, which can be utilized as an energy source.

2. Closed system motor as claimed in Patent claim 1, characterized in that the spirally-wound about a center axis elastic pipe is coiled with a constant coiling diameter.

3. Closed system motor as claimed in claim 1, characterized in that the straight pipe extends in the center of the spirally-wound about a center elastic pipe.

4. Closed system motor as claimed in claim 1, characterized in that a pump is connected in the system to pump the fluid.

5. Closed system motor as claimed in claim 1 characterized in that the angle of the spirally-wound about a center axis elastic pipe is about 95° with respect to the center axis.

6. Closed system motor as claimed in claim 2, characterized in that the straight pipe extends in the center of the spirally-wound about a center axis elastic pipe (3).

7. Closed system motor as claimed in claim 2, characterized in that a pump is connected in the motor to pump the fluid.

8. Closed system motor as claimed in claim 3, characterized in that a pump is connected in the motor to pump the fluid.

9. Closed system motor as claimed in claim 2, characterized in that an angle for the spirally-wound about a center axis elastic pipe is about 95° with respect to the center axis.

10. Closed system motor as claimed in claim 3, characterized in that an angle for the spirally-wound elastic pipe is about 95° with respect to the center axis.

11. Closed system motor as claimed in claim 4, characterized in that the angle of the spirally-wound elastic pipe is about 95° with respect to the center axis.

* * * * *

UNITED STATES PATENT AND TRADEMARK OFFICE
CERTIFICATE OF CORRECTION

PATENT NO. : 6,321,783 B1
DATED : November 27, 2001
INVENTOR(S) : Hillar Neem et al.

It is certified that error appears in the above-identified patent and that said Letters Patent is hereby corrected as shown below:

<u>Title page,</u>
Item [12], "Neem et al." should read -- Kangas et al. --
Item [76], Inventors, should read
-- Vladimer Kangas, Ronngarden 51, S-435 31,
  Hillar Neem, Tornrosvagen 16C, S-435 21, both of
  Molnlycke (SE) --

Signed and Sealed this

Twenty-sixth Day of August, 2003

JAMES E. ROGAN
*Director of the United States Patent and Trademark Office*